US009188267B2

(12) United States Patent
Fansler

(10) Patent No.: US 9,188,267 B2
(45) Date of Patent: Nov. 17, 2015

(54) CONNECTOR ASSEMBLY WITH RETAINER FOR JOINING FLUID CONDUITS

(75) Inventor: Douglas Milton Fansler, St. Clair, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 13/100,873

(22) Filed: May 4, 2011

(65) Prior Publication Data

US 2012/0056420 A1 Mar. 8, 2012

Related U.S. Application Data

(60) Provisional application No. 61/343,845, filed on May 4, 2010.

(51) Int. Cl.
*F16L 37/088* (2006.01)
*F16L 37/14* (2006.01)

(52) U.S. Cl.
CPC ............. *F16L 37/088* (2013.01); *F16L 37/144* (2013.01)

(58) Field of Classification Search
USPC ........................................... 285/23, 305, 321
See application file for complete search history.

(56) References Cited

U.S. PATENT DOCUMENTS

| 3,314,696 A * | 4/1967 | Ferguson et al. ......... 285/148.14 |
| 4,541,657 A * | 9/1985 | Smyth ............................ 285/305 |
| 4,561,682 A * | 12/1985 | Tisserat ........................ 285/305 |
| 4,635,974 A * | 1/1987 | Moussaian ..................... 285/305 |
| 5,000,614 A | 3/1991 | Walker et al. |
| 6,027,143 A * | 2/2000 | Berg et al. ....................... 285/93 |
| 6,983,958 B2 * | 1/2006 | Rautureau ....................... 285/305 |
| 6,997,486 B2 * | 2/2006 | Milhas ............................ 285/305 |
| 7,438,328 B2 * | 10/2008 | Mori et al. ..................... 285/305 |
| 7,597,362 B2 | 10/2009 | Hartmann |
| 2003/0094813 A1 | 5/2003 | Bucher et al. |
| 2005/0161946 A1 * | 7/2005 | Bauer ............................ 285/305 |
| 2007/0059972 A1 * | 3/2007 | Rigollet et al. ................ 439/441 |
| 2008/0224469 A1 * | 9/2008 | Ostergren et al. ............ 285/313 |
| 2008/0277929 A1 | 11/2008 | Bucher et al. |
| 2011/0031743 A1 * | 2/2011 | Chaupin ........................ 285/305 |

FOREIGN PATENT DOCUMENTS

| EP | 1705417 | 9/2006 |
| JP | 2001141158 | 5/2001 |
| JP | 2001289381 A | * 10/2001 |
| JP | 2002-295760 | 10/2002 |
| JP | 2004125035 | 4/2004 |
| JP | 2004-211891 | 7/2004 |
| JP | 2007-508496 | 4/2007 |

OTHER PUBLICATIONS

International Search Report for PCT/US2011035269, Feb. 8, 2012, 3 pages.
Written Opinion for PCT/US2011035269, Feb. 8, 2012, 4 pages.

* cited by examiner

*Primary Examiner* — David E Bochna
*Assistant Examiner* — James Linford
(74) *Attorney, Agent, or Firm* — Harness, Dickey & Pierce, P.L.C.

(57) ABSTRACT

A connector assembly that provides fluid communication between a first conduit and a second conduit. The connector assembly includes a first coupler, a retainer, and a second coupler. The retainer is carried by the first coupler. The second coupler has a groove. When the first and second couplers are brought together, they fluidly communicate with each other and the retainer is received with the groove so that the first and second couplers are prevented from unintentionally coming apart.

21 Claims, 21 Drawing Sheets

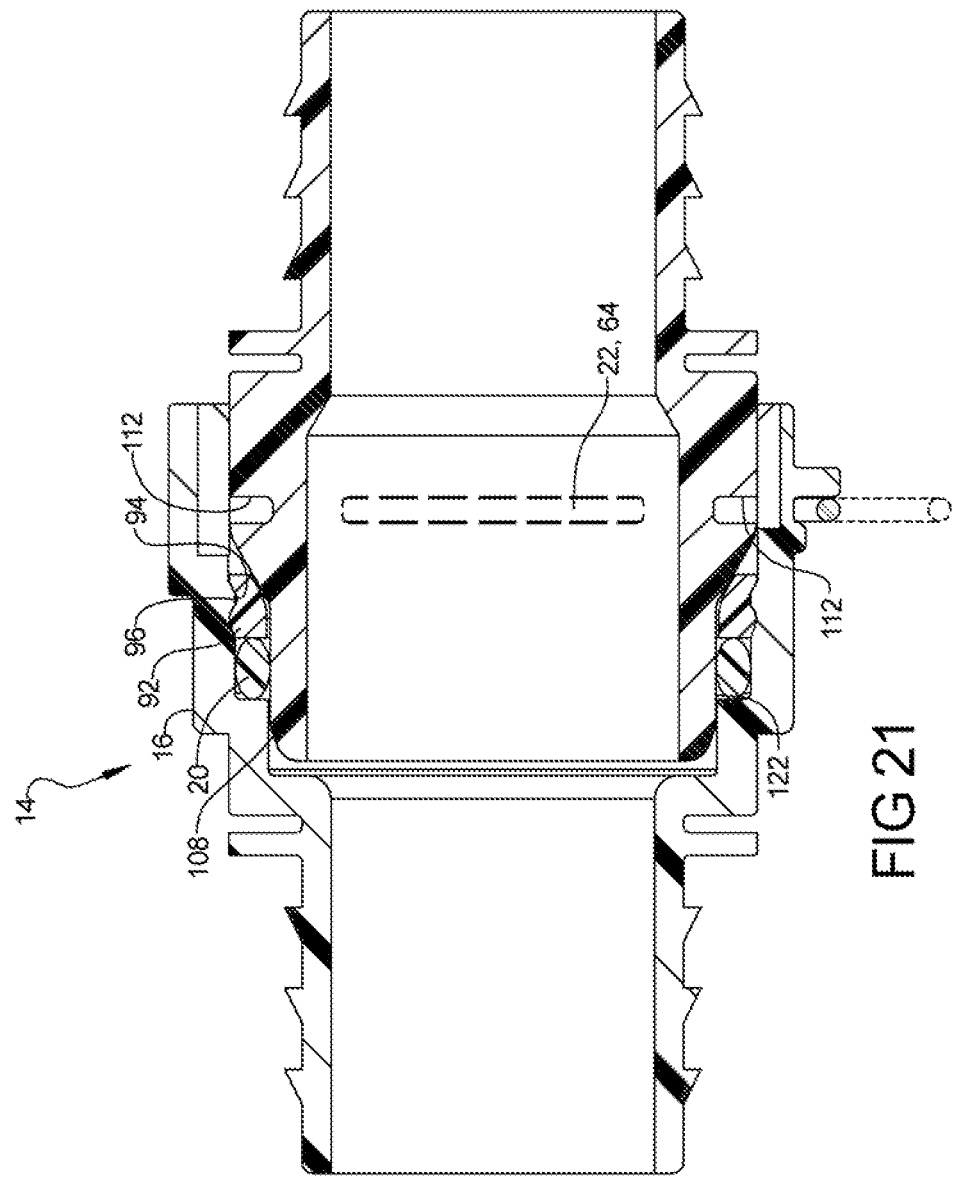

CONNECTOR ASSEMBLY WITH RETAINER FOR JOINING FLUID CONDUITS

CROSS-REFERENCE TO RELATED APPLICATION

This application claims the priority of U.S. Provisional Application No. 61/343,845, filed May 4, 2010, the entire contents of which are hereby incorporated by reference.

TECHNICAL FIELD

This invention relates to connector assemblies that join two fluid conduits in a substantially leak-proof connection.

BACKGROUND OF THE INVENTION

This section provides background information related to the present disclosure which is not necessarily prior art. Connection joints that join two fluid lines are currently known in the art. However, such connection joints have not been without their share of limitations. One limitation of some current connection joints is the necessity to use tools, such as screwdrivers, to tighten screws that secure one or both of the fluid lines together. Another limitation of some current connection joints is their tendency to give a user the impression that the fluid connection lines are securely joined together, when in fact they are not, thus potentially separating during the transfer of fluid within the lines and through the connection joint.

SUMMARY OF THE INVENTION

In accordance with an embodiment of the invention, there is provided a connector assembly including a female coupler, a retainer, and a male coupler. The female coupler has a first end and has a second end. The female coupler has a first fluid passage that extends between the first and second ends. The second end is constructed to fit with a first conduit. The retainer is carried by the female coupler. The retainer has a portion that can be located within the first fluid passage. The male coupler has a first end that can be inserted into the first end of the female coupler. The male coupler has a second end that is constructed to fit with a second conduit. The male coupler has a second fluid passage that extends between the first and second ends of the male coupler. The male coupler has a groove. When the female coupler and the male coupler are brought together and the first and second fluid passages communicate with each other, the portion of the retainer can be received within the groove of the male coupler in order to inhibit separation of the male and female couplers.

In accordance with another embodiment of the invention, there is provided a connector assembly including a first coupler, a second coupler, and a retainer. The first coupler has a first end and has a second end. The first coupler has a first fluid passage that extends between the first and second ends. The second end is constructed to fit with a first conduit. The first coupler has a slot that is open to the first fluid passage. The second coupler has a first end and a second end. The second coupler has a second fluid passage that extends between the first and second ends of the second coupler. The second end of the second coupler is constructed to fit with a second conduit. The second coupler has a groove. The retainer is carried by the first coupler, and the retainer has a portion that can extend through the slot of the first coupler. When the first and second coupler are brought together and the first and second fluid passages communicate with each other, the slot and the groove are aligned with each other and the portion of the retainer can be extended through the slot and can be received within the groove in order to inhibit separation of the first and second couplers.

In accordance with yet another embodiment of the invention, there is provided a connector assembly that includes a first coupler, a second coupler, and a wire spring. The first coupler has a first end and has a second end. The first coupler has a first fluid passage that extends between the first and second ends. The second end is constructed to fit with a first conduit. The first coupler has a slot. The second coupler has a first end and has a second end. The second coupler has a second fluid passage that extends between the first and second ends of the second coupler. The second end of the second coupler is constructed to fit with a second conduit. The second coupler has a groove and has a chamfer located at an exterior surface of the second coupler. The chamfer is positioned forward of the groove with respect to the first end of the second coupler. The wire spring is carried externally around a part or more of the first coupler. The wire spring has a leg that can be extended through the slot of the first coupler and that can be received within the groove of the second coupler. In a first circumstance when the first and second couplers are brought together and the first and second fluid passages communicate with each other, the leg of the wire spring is extended through the slot of the first coupler, the leg of the wire spring rides on the chamfer of the second coupler, and the leg of the wire spring is received within the groove of the second coupler in order to inhibit separation of the first and second couplers. In a second circumstance when the first and second coupler are brought together and the first and second fluid passages communicate with each other, the wire spring is moved from a first position to a second position. In the first position, the leg of the wire spring is located outside of the first fluid passage and the leg is not received within the groove of the second coupler. And in the second position, the leg of the wire spring is extended through the slot of the first coupler and is received within the groove of the second coupler in order to inhibit separation of the first and second couplers.

BRIEF DESCRIPTION OF THE DRAWINGS

Preferred exemplary embodiments of the invention will hereinafter be described in conjunction with the appended drawings, wherein like designations denote like elements, and wherein:

FIG. 21 is a cross-sectional view depicting the male coupling member of FIG. 18 locked into the female coupling member of FIG. 1.

DETAILED DESCRIPTION OF THE PREFERRED EMBODIMENTS

Figure 1:
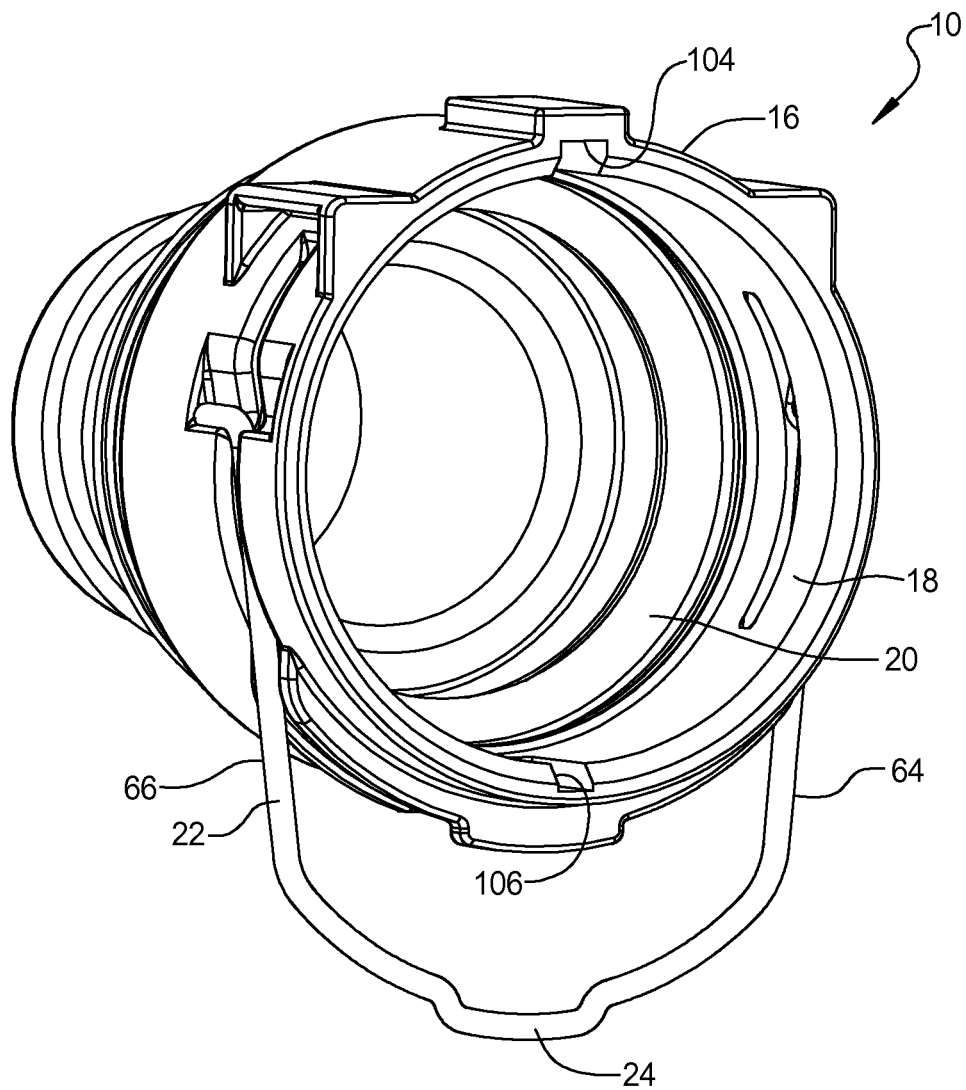
FIG. 1 is a perspective view of an embodiment of a female coupling member.
Figure 2:
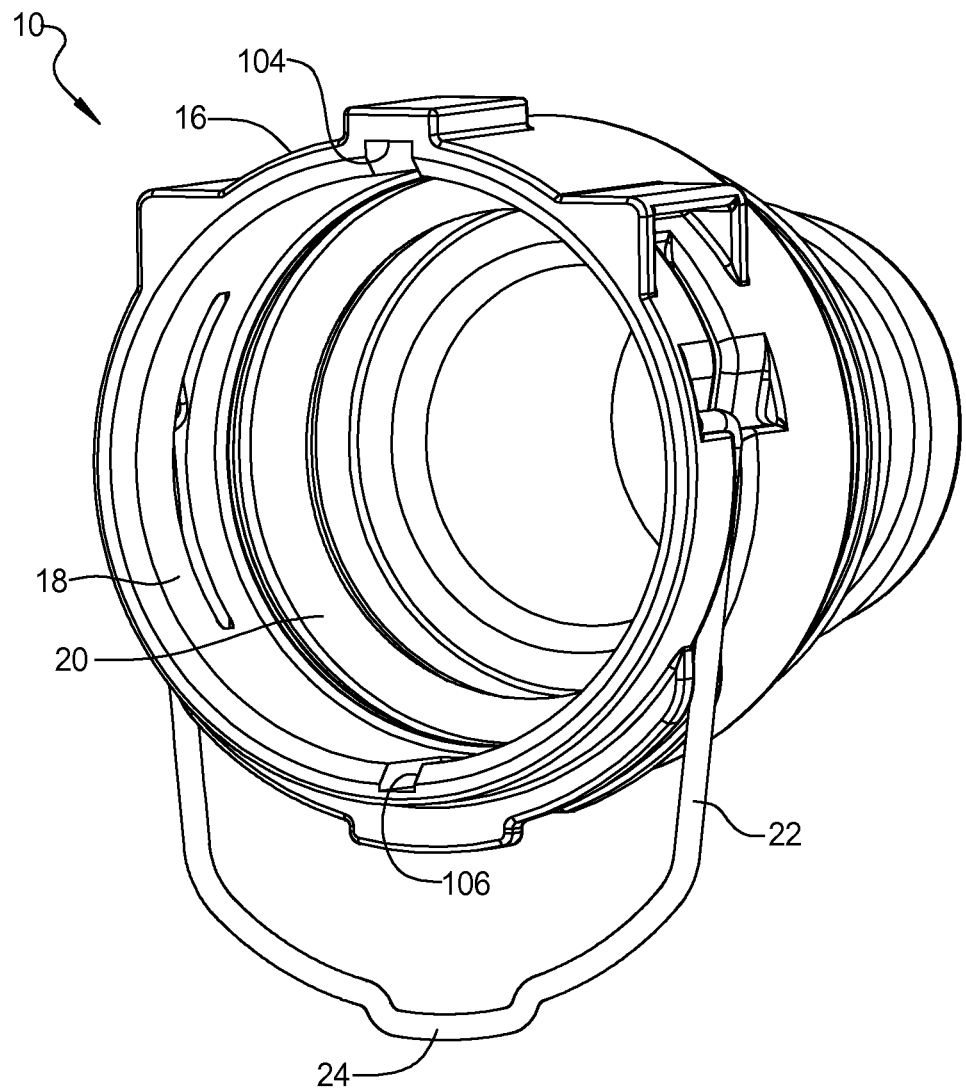
FIG. 2 is a perspective view of the female coupling member of FIG. 1.

With reference now to FIGS. 1-21 of the drawings, the teachings of embodiments of the present disclosure will be presented. Turning first to FIG. 1, a female coupling member, or female coupler, or first coupler, 10 is depicted with a variety of ways to securely lock or couple with a male coupling member, male coupler, or second coupler, 12, depicted in FIG. 16, to form a quick connector assembly, or connector assembly, 14 (FIG. 19). Continuing, with FIGS. 1 and 2, a housing 16 of female coupling member 10, which may be hollow with a through hole or fluid passage, provides a receptacle 18 for male coupling member 12. A seal 20, which may be an O-ring, provides a circular and annular elastomeric surface against which the male coupling member 12 may seal, which will be presented later. A retainer 22, which may be a u-shaped metal piece formed from wire or wire-like stock or a wire spring, may be moved to various positions within and around the female coupling member 10 to lock or unlock the male coupling member 12 from within the female coupling member 10. Retainer 22 may have raised portion, or bridge, 24, relative to the balance of retainer 22, to provide a simple mechanical device that is externally accessible by a user to remove retainer 22 from housing 16, such as with a finger or screwdriver-like lever arm or other way.

Figure 3:
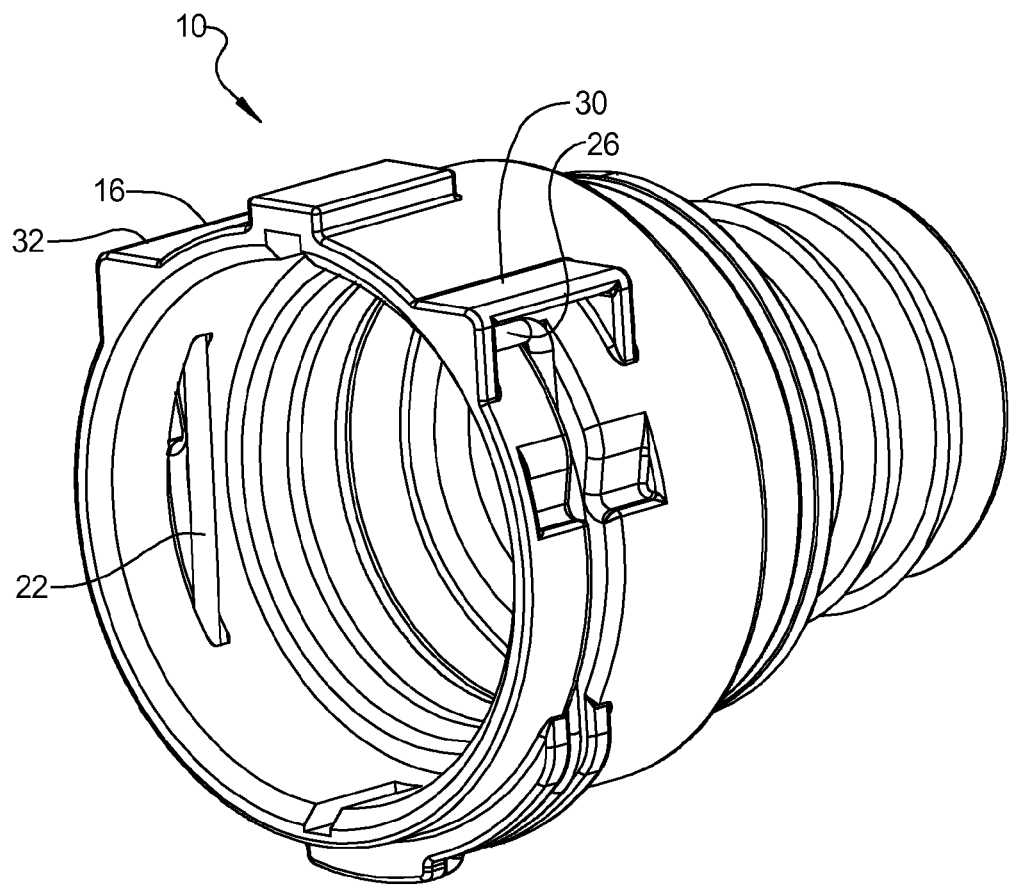
FIG. 3 is a perspective view of the female coupling member of FIG. 1.
Figure 4:
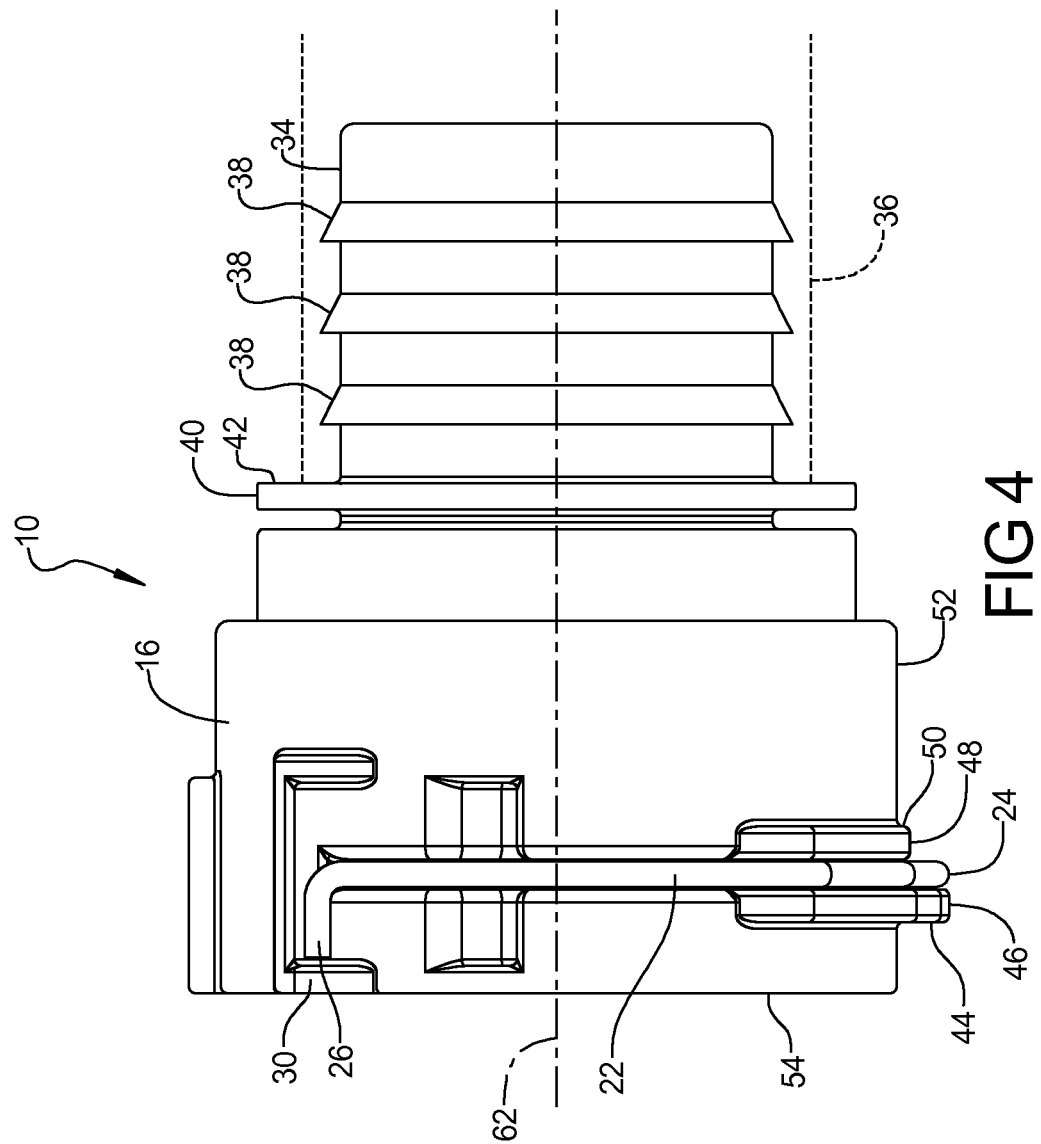
FIG. 4 is a front view of the female coupling member of FIG. 1.

FIG. 3 depicts female coupling member 10 with retainer 22 in its fully installed position such that a retainer end 26 and a retainer end 28 (FIG. 6) each reside within or under a cover 30, 32 or shield to protect retainer ends 26, 28. The covers 30, 32 may also act as a stop, which is a structure to stop or prevent ends 26, 28 from moving and thus preventing prongs 64, 66, also known as first and second legs, from moving deeper into the interior volume and fluid passage of housing 16. Moreover, by protecting retainer ends 26, 28, the retainer ends 26, 28 are unlikely to contact on any material that may contact housing 16 and inadvertently dislodge retainer 22 from its installed position and thereby dislodge male coupling member 12 from female coupling member 10. FIG. 4 depicts a male end 34 of female coupling member 10. More specifically, male end 34 may receive a flexible conduit 36 such as a rubber hose that may be inserted over a nipple with barbed flanges 38 to transport a fluid through the female coupling member 10 and male coupling member 12. Male end 34 may be equipped with a conduit stop flange 40 so that conduit 36 may stop and abut against a flange surface 42 when conduit 36 is forced over barbed flanges 38. Also depicted in FIG. 4 is how retainer end 26 resides within cover 30 of housing 16 when retainer 22 is fully installed into housing 16. More specifically, when retainer 22 is fully installed or inserted within housing 16, raised portion 24 of retainer 22 lies beside or behind a high retainer flange 44, without protruding beyond or above an end 46 of retainer flange 44, but does protrude beyond an end 48 of a low retainer flange 50, as depicted in FIG. 4. While raised portion 24 lies at or below end 46 of flange 44, raised portion 24 does lie above or beyond end 48 of retainer flange 50 to permit a human finger or leverage device to release or extract retainer 22 from housing 16. Because flange ends 46, 48 protrude above a general exterior surface 52 of housing 16, flanges 44, 50 protect retainer 22 from being damaged and from moving from its otherwise parallel position relative to an end face 54 of housing 16.

Figure 5:
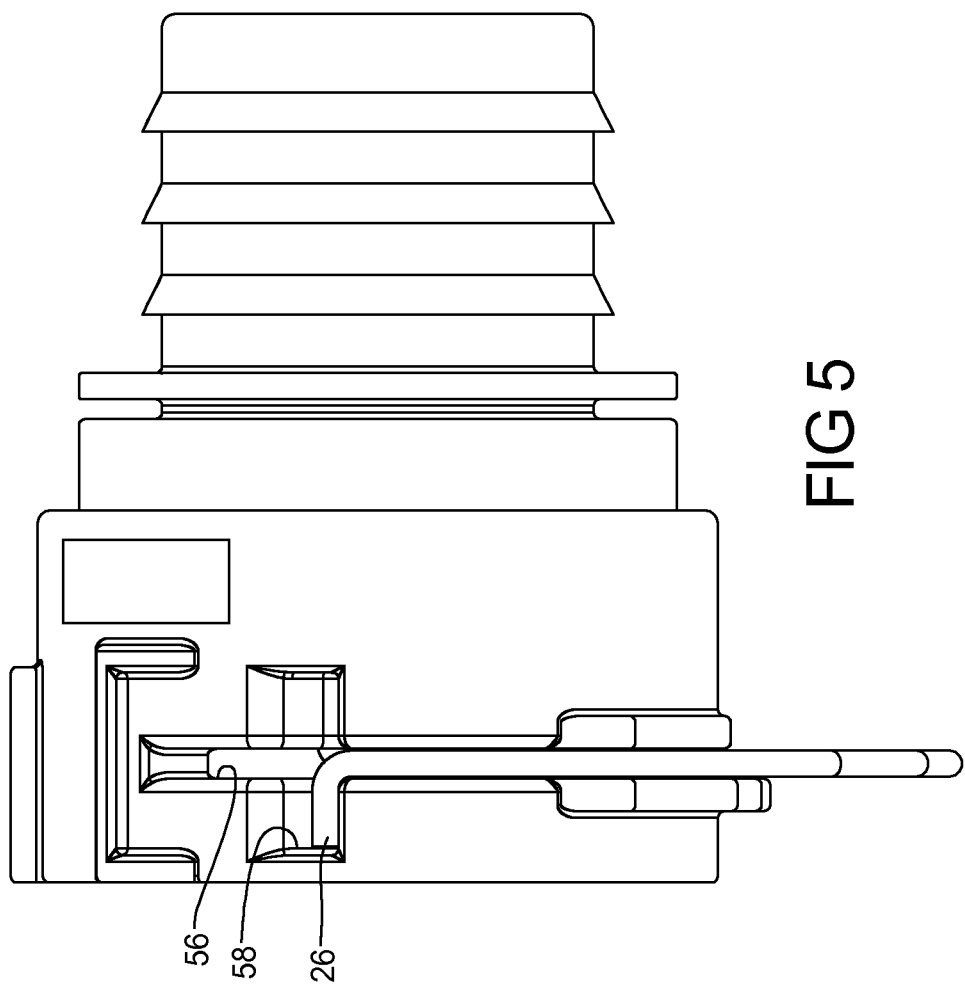
FIG. 5 is a front view of the female coupling member of FIG. 1.
Figure 6:
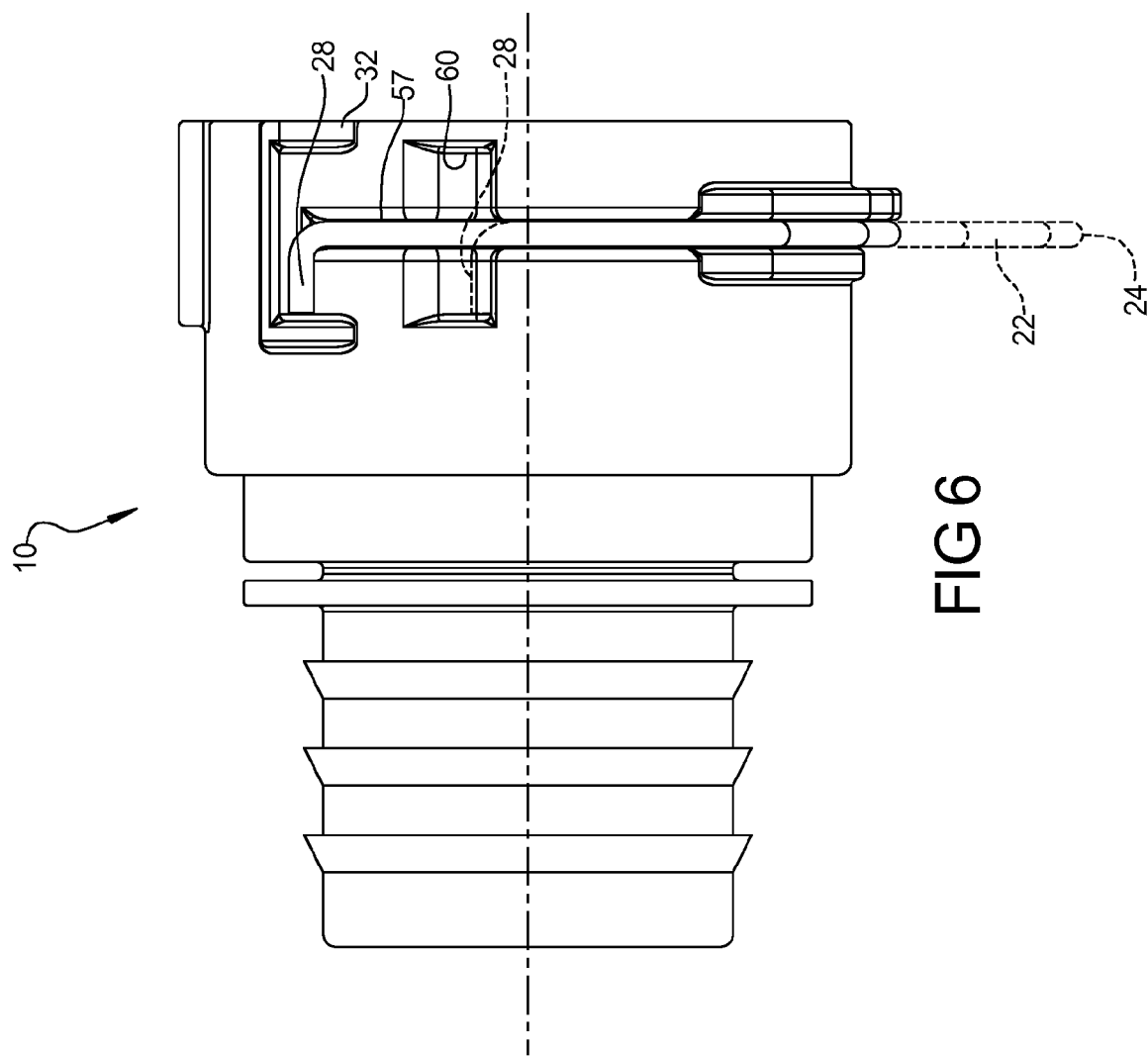
FIG. 6 is a rear view of the female coupling member of FIG. 1.
Figure 7:
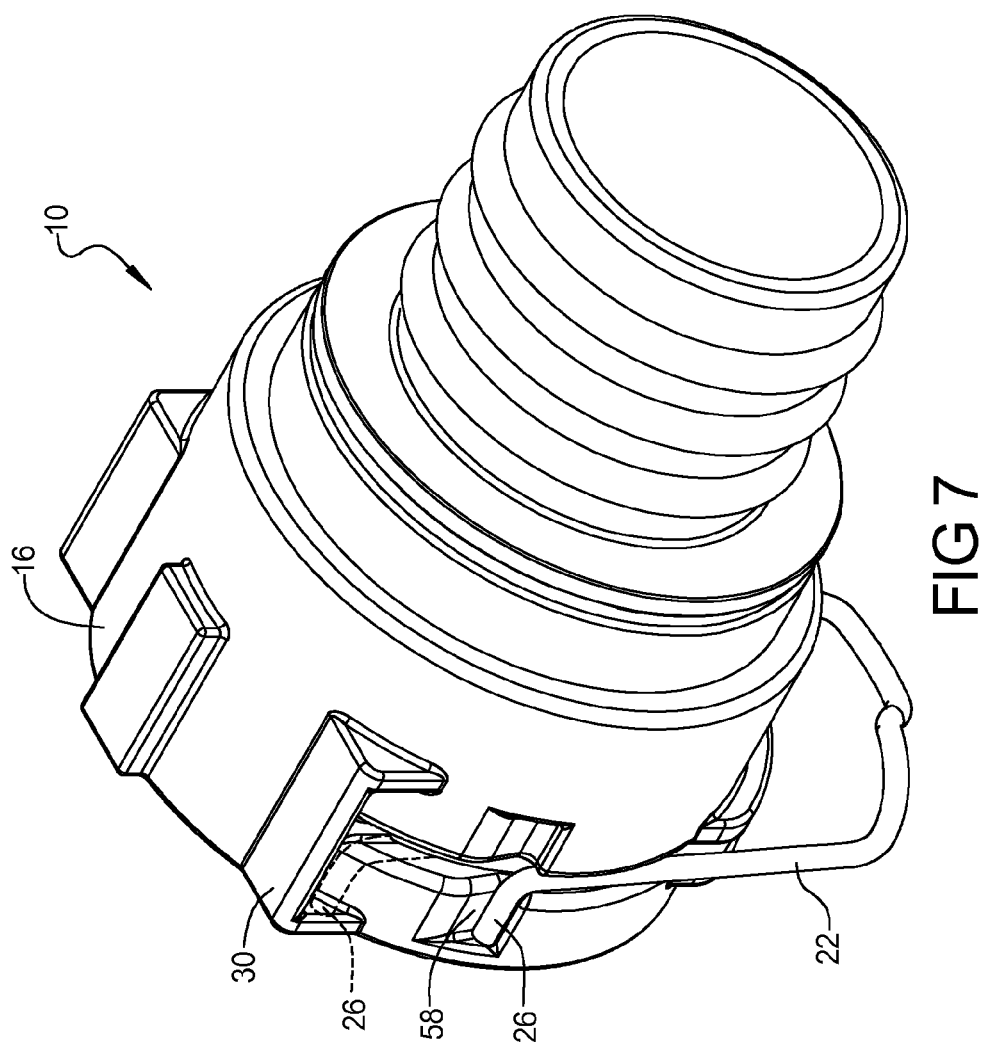
FIG. 7 is a perspective view of the female coupling member of FIG. 1.

While FIG. 4 depicts retainer 22 in its installed or first position within housing 16, FIG. 5 depicts housing 16 with retainer 22 extracted or pulled from its installed position and in its released or open or second position. More specifically, when retainer 22 is in its installed position, ends 26, 28 reside within their respective covers 30, 32. However, when in its open position, as depicted in FIG. 5, retainer end 26 resides in a first housing groove or recess 58 and retainer end 28 resides in a second housing groove or recess 60 (FIG. 6). For clarity, FIG. 6 depicts end 28 within groove 60 and end 28 under cover 32 to simultaneously depict the possible locations of retainer 22, even though only one retainer 22 exists and only one position of end 28 may occur at any one time.

Figure 8:
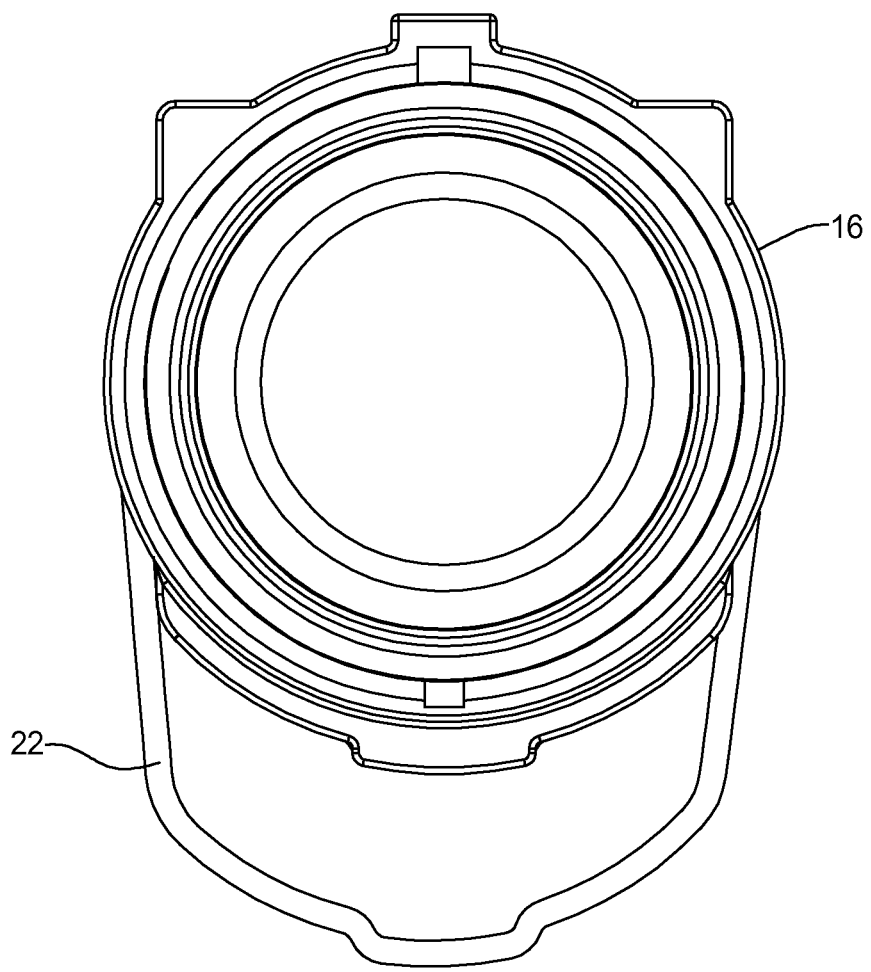
FIG. 8 is a left side view of the female coupling member of FIG. 1.
Figure 9:
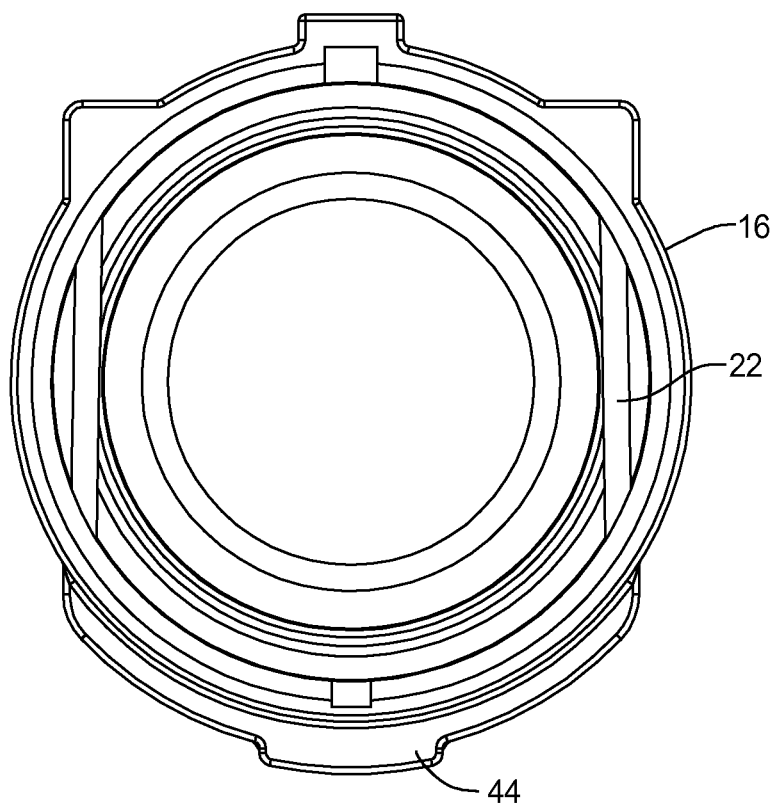
FIG. 9 is a left side view of the female coupling member of FIG. 1.

FIGS. 8 and 9 depict left side views of female coupling member 10 and more specifically, FIG. 8 depicts retainer 22 in an extracted or open position and FIG. 9 depicts retainer 22 in its installed or locked position. As depicted in FIG. 8, when retainer 22 is extracted or open, retainer does not protrude and extend through a housing through slot, or slot, 56 (FIG. 5) an into an interior and fluid passage of housing 16, but as depicted in FIG. 9, when retainer 22 is installed, part of retainer 22 protrudes, extends, and is located into the interior and fluid passage of housing 16. The slot 56 is open to the fluid passage of the housing 16 and communicates with the fluid passage of the housing 16. Additionally, when retainer 22 is installed within housing 16, raised portion 24 of retainer 22 is secured between retainer flange 44 and flange 50 to prevent any movement of retainer 22, such as movement parallel to longitudinal axis 62 (FIG. 4). Although retainer flanges 44, 50 prevent movement of retainer 22, housing through slot 56 also prevents movement of retainer 22 in a direction parallel to longitudinal axis 62. Moreover, when retainer 22 is installed, ends 26, 28 respectively reside within an interior partly defined by covers 30, 32, as depicted in FIG. 9.

Figure 10:
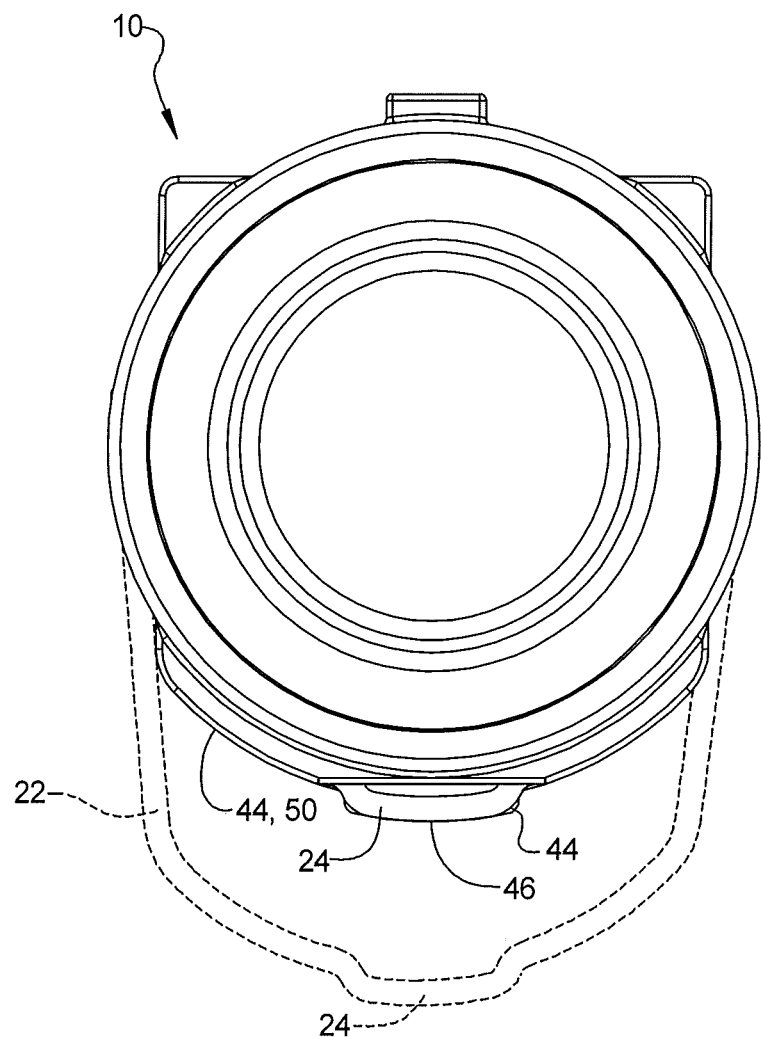
FIG. 10 is a right side view of the female coupling member of FIG. 1.

FIG. 10 is a right side view of female coupling member 10 and depicts the presence of retainer 22 in two positions. More specifically, retainer 22 is depicted in its open or extracted or first position and in its installed or second position. When in its installed position, raised portion 24 of retainer 22 is positioned immediately adjacent to retainer flange 44 such that end 46 of retainer flange 44 and raised portion 24 may be at equal levels with each other, but such that a highest portion of retainer flange 50 resides below or at a level less than the highest portion of raised portion 24 of retainer 22.

Figure 11:
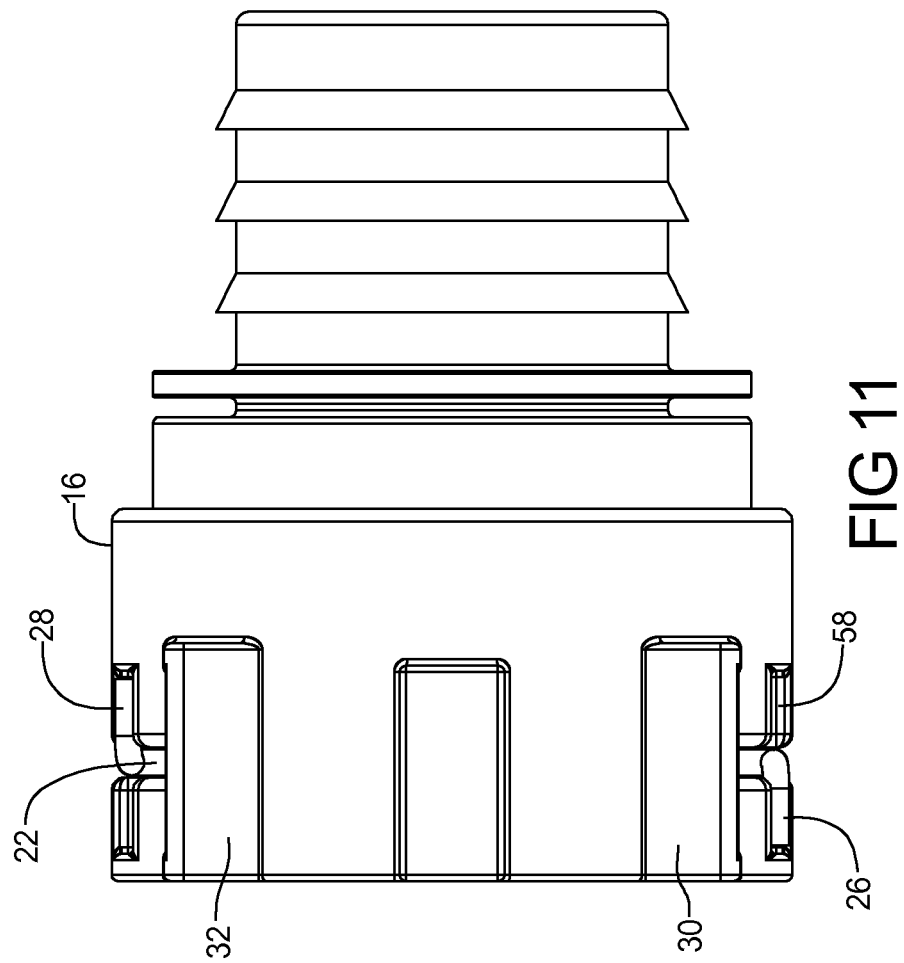
FIG. 11 is a top view of the female coupling member of FIG. 1.
Figure 12:
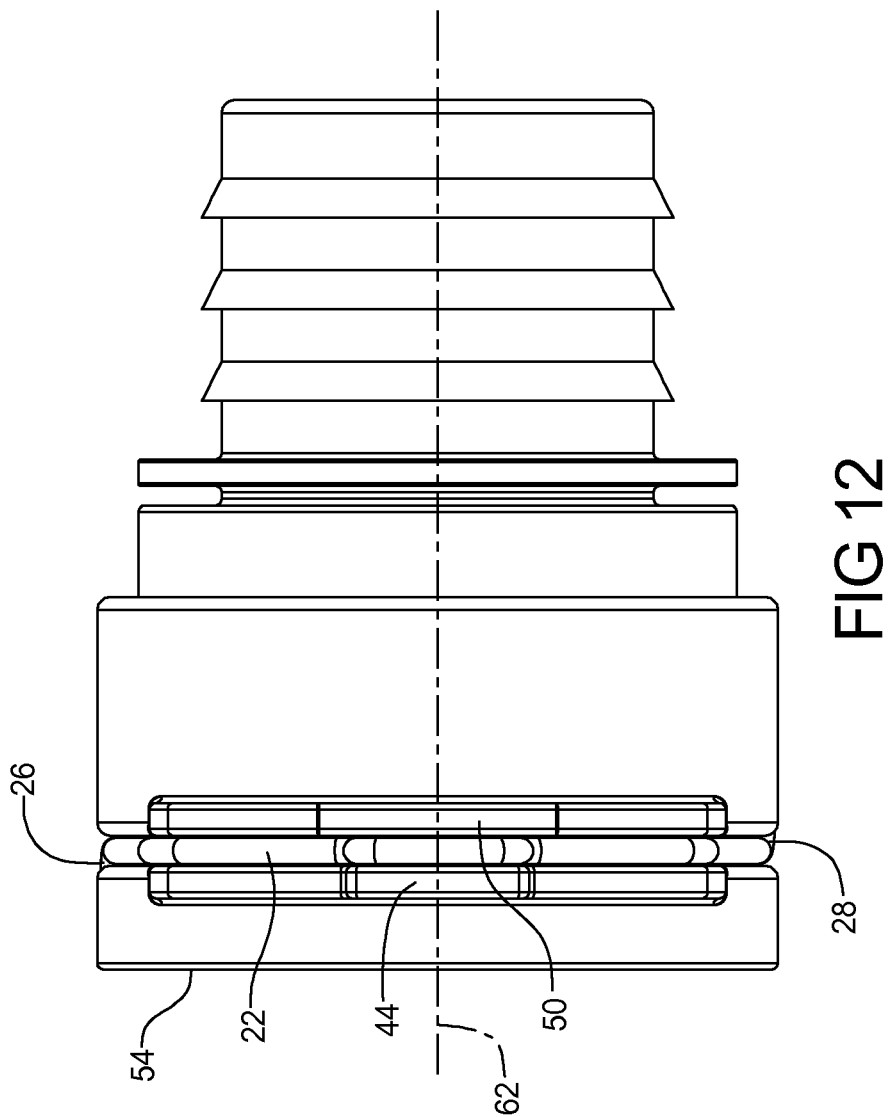
FIG. 12 is a bottom view of the female coupling member of FIG. 1.

FIG. 11 is a top view of female coupling member 10 depicting a location of retainer 22 when retainer 22 is in its open or retracted position, yet still attached (e.g. contacts due to a spring force) to housing 16. More specifically, retainer 22 may be made of a metal so that retainer 22 acts as a spring as a first prong 64 or first leg 64 and second prong 66 or second leg 66 of retainer 22 are forced away from each other when ends 26, 28 contact an outer surface of housing 16. Despite the location of ends 26, 28 of retainer 22 on an exterior surface of housing 16, ends 26, 28 always contact housing 16 and exert a force upon housing 16. Continuing with FIG. 11, because retainer 22 is in its retracted position, ends 26, 28 are not depicted under covers 30, 32 but rather end 26 is located in groove 58 and end 28 is located in groove 60. Similar to FIG. 11 in depicting retainer 22 is in its open or retracted position, FIG. 12 is a bottom view of female coupling member 10. More specifically, retainer 22 and raised portion 24 of retainer 22 are depicted situated between retainer flanges 44, 50 to prevent retainer 22 from moving in a direction parallel to central longitudinal axis 62.

Figure 13:
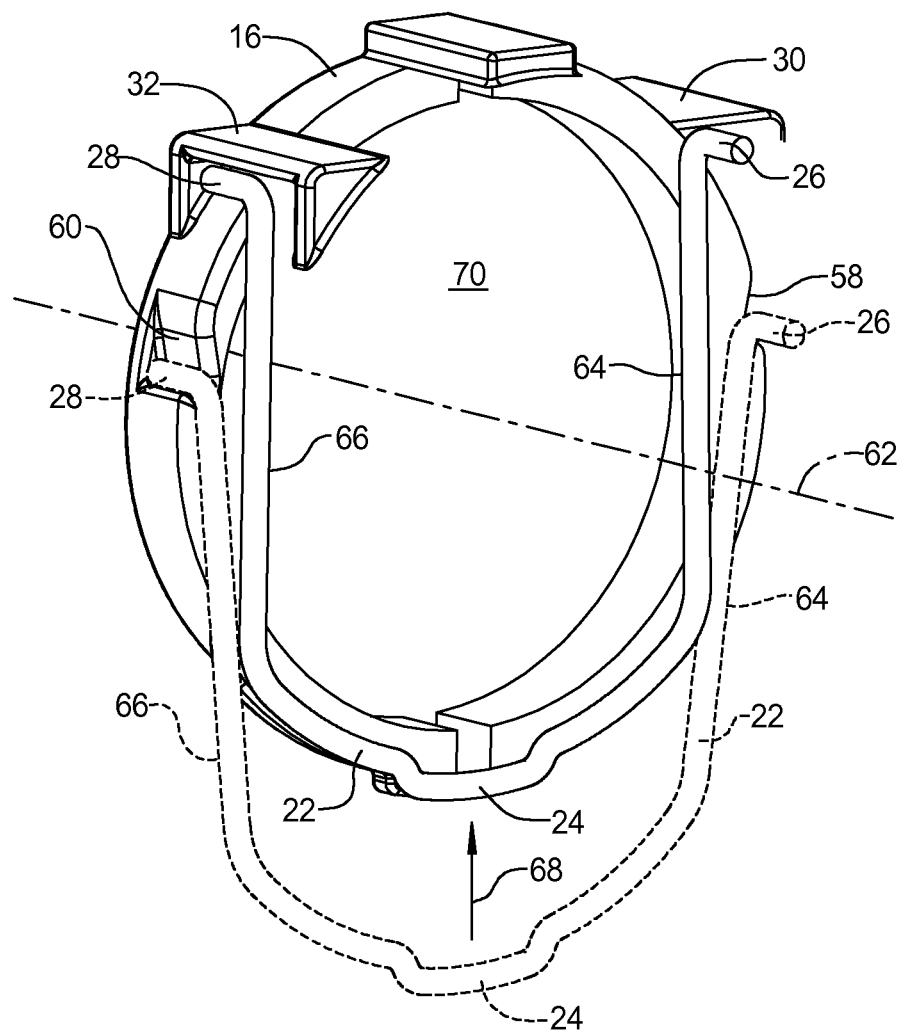
FIG. 13 is a perspective view of part of a housing of the female coupling member of FIG. 1 and dual positions of a retainer.

To better exemplify potential positions of retainer 22 on and through housing 16, FIG. 13 depicts retainer 22 and only part of housing 16, with the balance of female coupling member 10 parts removed from FIG. 13. More specifically, FIG. 13 depicts retainer 22 in its two likely positions, first retainer 22 may be positioned in its open or retracted position in which ends 26, 28 of retainer prongs 64, 66 respectively reside in corresponding grooves 58, 60 of housing 16 that are approximately at 3 O'clock and 9 O'clock positions of housing 16 when viewed as depicted in FIG. 13. To move retainer 22 and change position of retainer ends 28, 28 to a lock position, retainer 22 may be moved upwards in a direction in accordance with arrow 68 and in a direction toward the fluid passage of the housing in order to cause the spring loaded retainer prongs 64, 66 to be forced together and toward each other to thereby move into a respective cover 30, 32. When end 26 is within cover 30 and end 28 is within cover 32, prong 64 and prong 66 move into an interior volume 70 or fluid passage of the housing by passing and extending through housing through slots 56, 57 (FIGS. 5 and 6) in housing 16.

Figure 14:
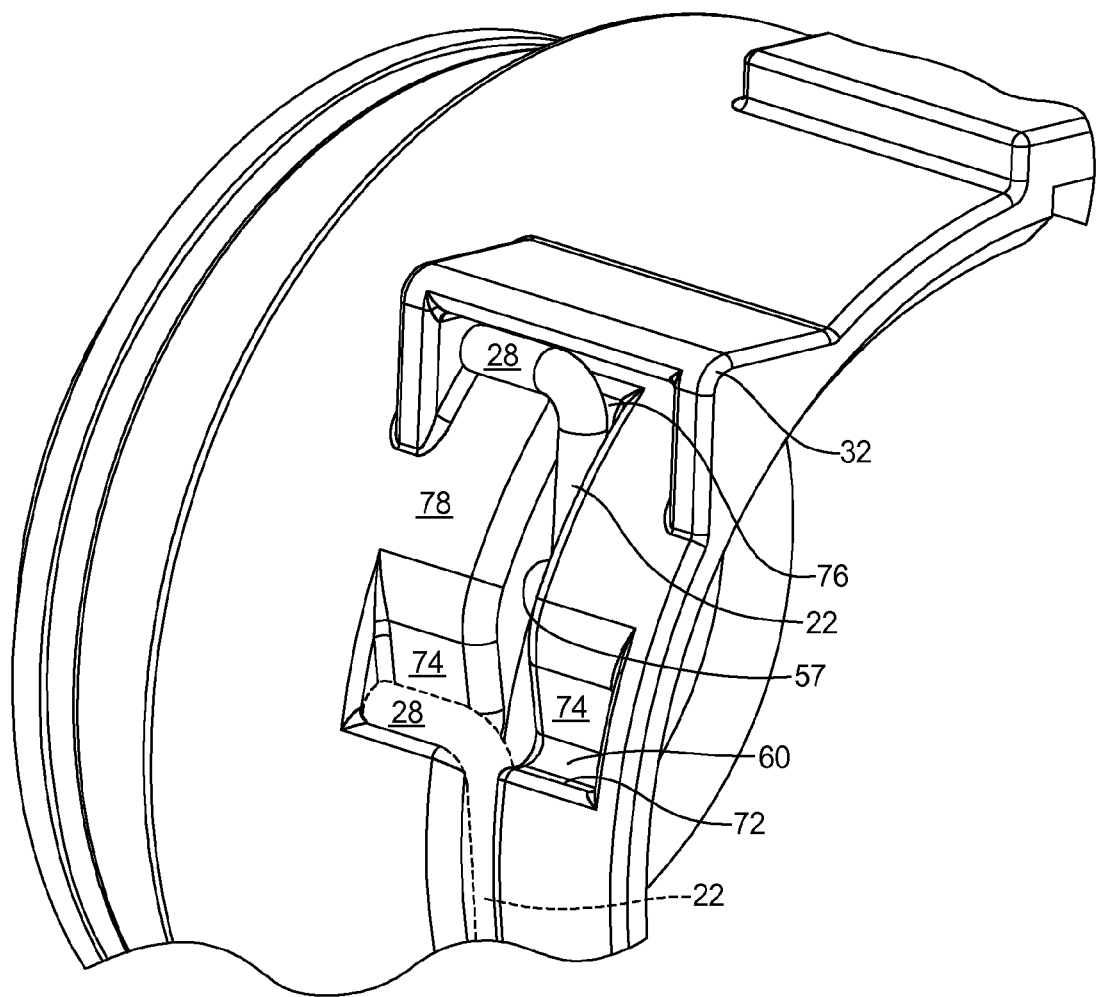
FIG. 14 is a perspective rear view of the female coupling member of FIG. 1 depicting open and locked locations of a retainer.

FIGS. 13 and 14 show the use of the retainer 22, such as a wire spring retainer that is made from metal, with elastic or spring-back properties. More specifically, retainer end 28 lies within groove 60 when retainer 22 is in its retracted position. Retainer end 28 can not move from groove 60, regardless of female coupling member 10 position, unless acted upon by an outside force, because groove 60, which spans both sides of housing through slot 57, is formed by a wall 72 and a slope 74 and end 28 contacts wall 72 and slope 74. Thus, because end 28 exerts a force substantially toward longitudinal centerline 62, a force in a different direction is required to move end 28 from groove 60. To move end 28 from groove 60 and upward to end of housing through slot 57 and under cover 32, a force in accordance with arrow 68, as discussed in conjunction with FIG. 13, or similar force, is required. When an external force is applied to retainer 22 in its extracted position in order to move retainer end 28 from groove 60 to under cover 32, proximate or at a slot end 76, retainer end 28 passes along and upon slope 74 and onto housing exterior surface 78 before settling under cover 32. Although an external force, such as supplied by a human hand or finger, is necessary to begin moving the retainer 22, once the retainer 22 is in motion, the spring-back or elastic nature of the retainer 22 assists in moving end 28 under cover 32.

Figure 15:
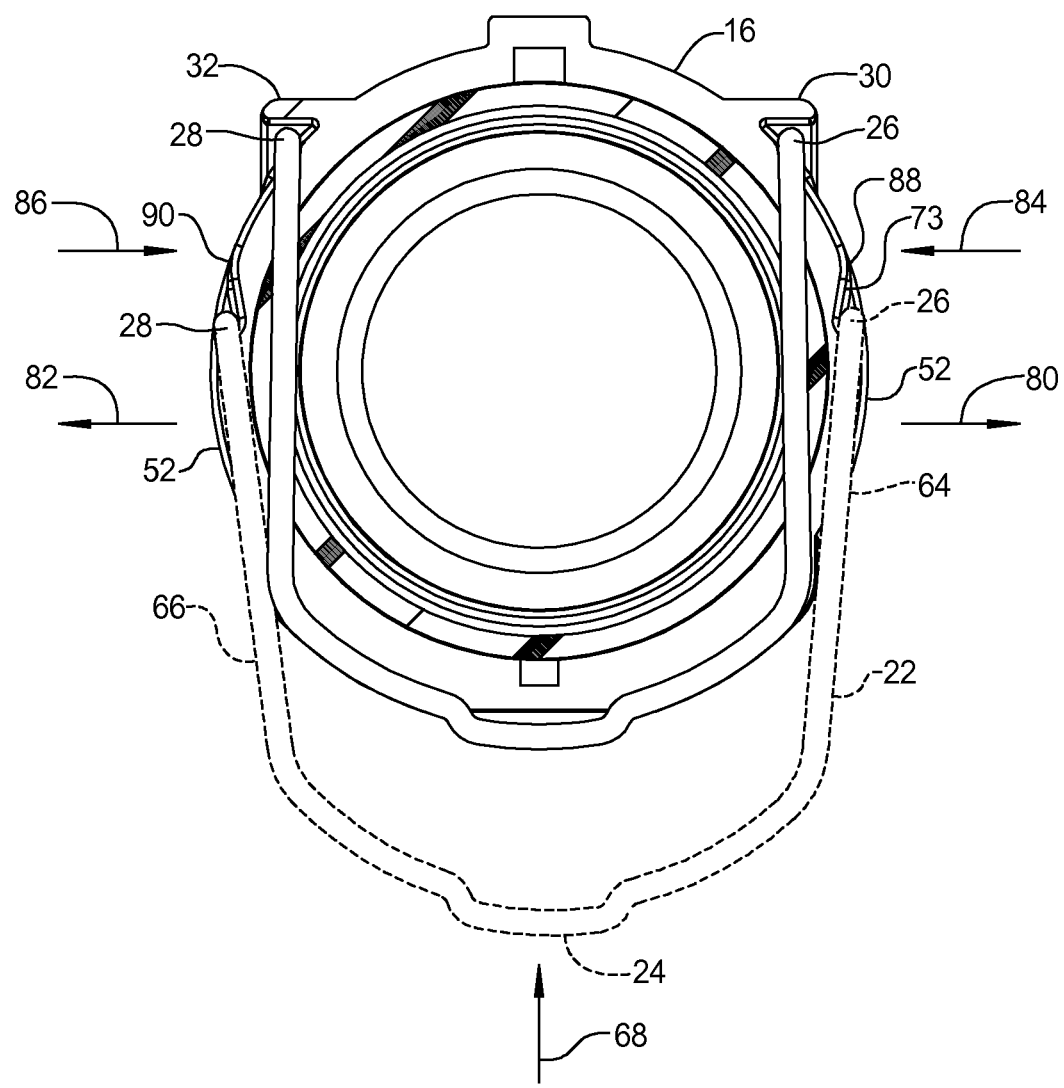
FIG. 15 is a cross-sectional view of part of a housing of the female coupling member of FIG. 1 and dual positions of a retainer.

With reference to FIG. 15, when a force in accordance with arrow 68 is applied to raised portion 24 of retainer 22 when retainer ends 26, 28 are residing in grooves 58, 60, the retainer ends 26, 28 will begin to move from grooves 58, 60 and move toward their respective covers 30, 32, which may act as a stop or barrier for ends 26, 28. As the ends 26, 28 move, the retainer prongs 64, 66 move within and through a respective housing through slot 56, 57 and ends 26, 28 slide upon and contact housing surface 52. Because retainer prongs 64, 66 are elastic and flexible, prongs 64, 66 retain a restoring force to spring back or elastically return to their pre-flexed positions, as ends 26, 28 move along sloped surfaces 73, 74 when ends 26, 28 move from their respective groove 73, 74. Thus, as each end 26, 28 moves from its respective groove 73, 74, prongs 64, 66 move away from each other, that is, prong 64 moves in accordance with arrow 80 and prong 66 moves in accordance with arrow 82. As prongs 64, 66 move farther away from each other and the distance between them increases, the force necessary to increase such distance between them also increases and the restoring force, or stored spring-back force, becomes greater. When the ends 26, 28 of prongs 64, 66 reach peaks 88, 90 on the housing surface, the restoring force is at its greatest and further urging of retainer 22 toward covers 30, 32 then requires less force. Less force is required to move ends 26, 28 beyond or past their respective peaks 88, 90, because after passing peaks 88, 90 ends 26, 28 begin to move toward each other as ends 26, 28 proceed toward covers 30, 32. As the straight-line distance between ends 26, 28 becomes less, the force stored in the prongs 64, 66 is used to bring the ends 26, 28 closer together and inwardly toward the fluid passage of the housing. Thus, the force, as indicated by arrow 68, required to move the ends 26, 28 to covers 30, 32 becomes less and less until each end 26, 28 is under a respective cover 30, 32. When ends 26, 28 are under a respective cover 30, 32, prongs 64, 66 then reside within internal volume 70 of housing 16 to securely lock male coupling member 12 in place within female coupling member 10, which will be presented later.

Figure 16:
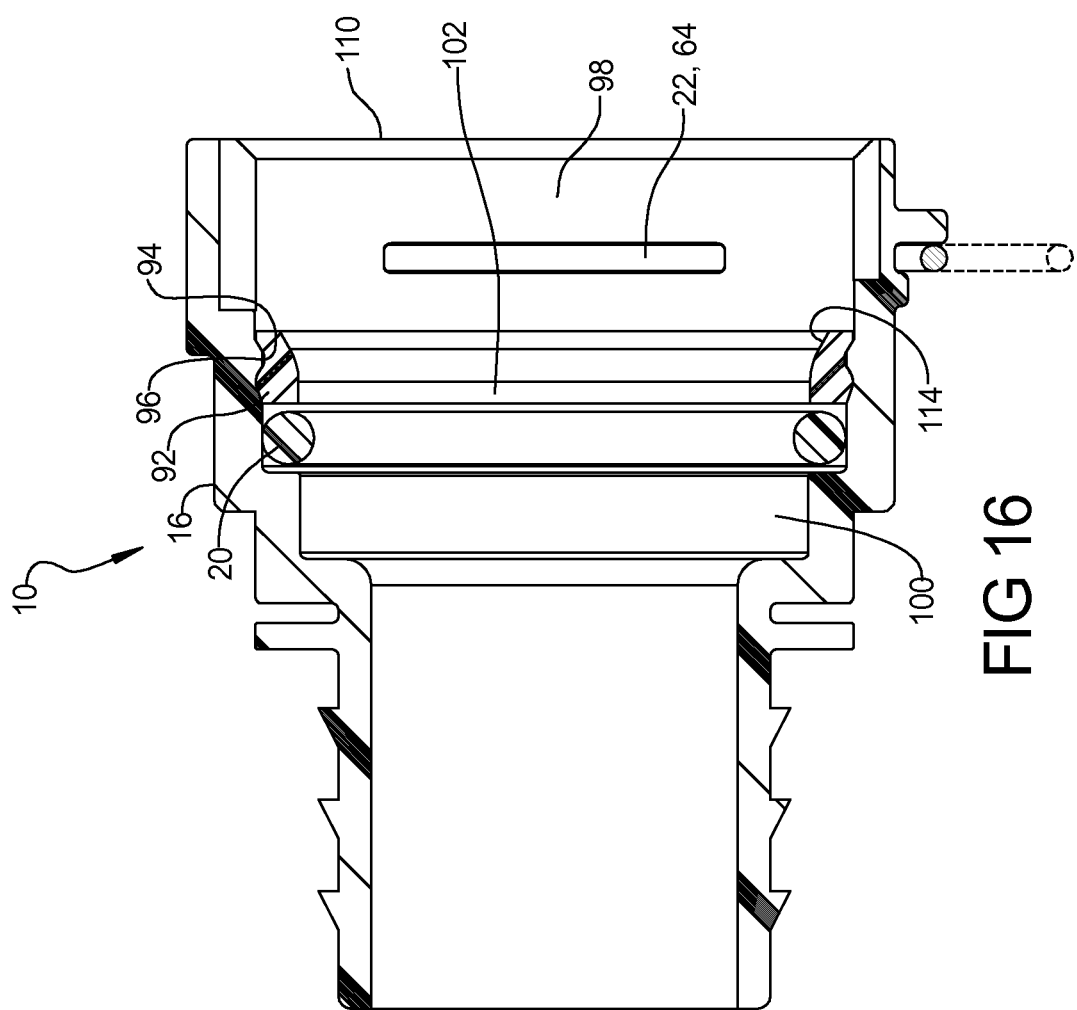
FIG. 16 is a cross-sectional view of the female coupling member of FIG. 1, depicting an internal O-ring, a bushing, and a retainer.
Figure 17:
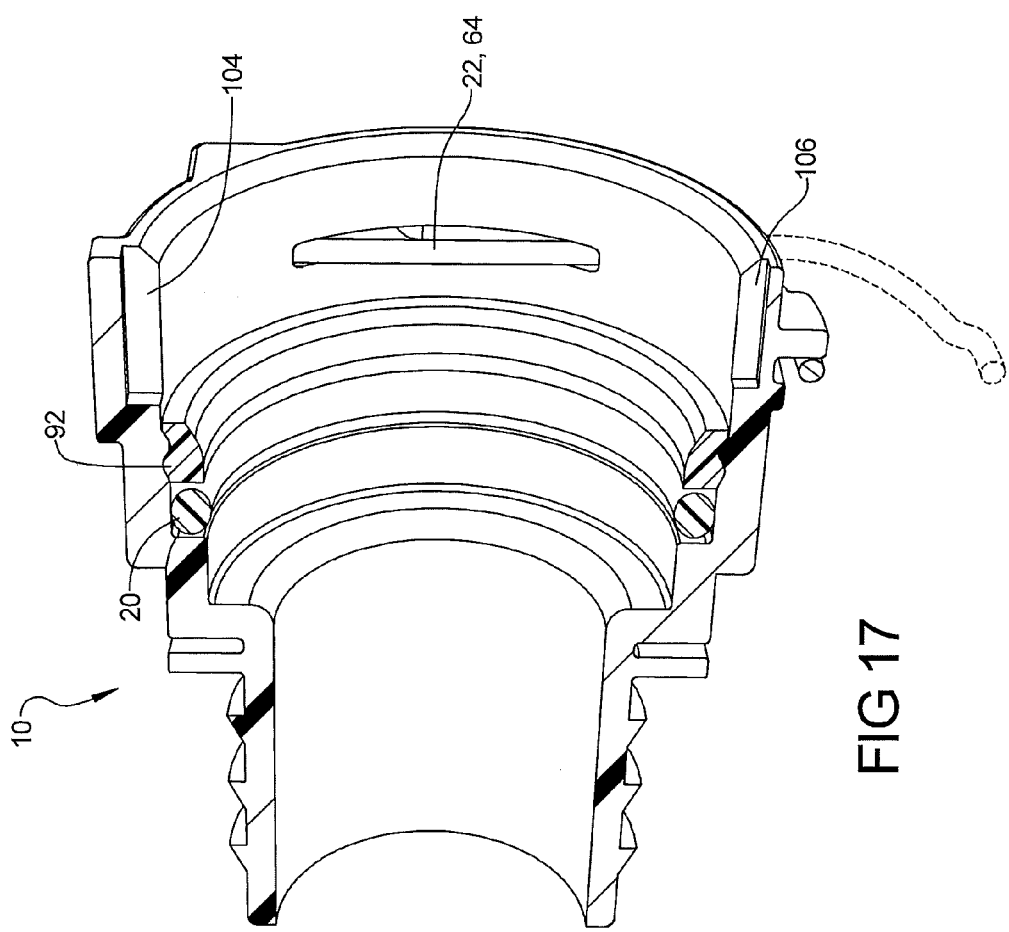
FIG. 17 is a cross-sectional view of the female coupling member of FIG. 1, depicting an internal O-ring, a bushing, and a retainer.

FIGS. 16 and 17 depict cross-sectional views of female coupling member 10, and exhibit the spatial relationships, which include but are not limited to seal or O-ring 20, a bushing 92, and prong 64 of retainer 22. FIG. 16 depicts an outside diameter of bushing 92 that has a small annular groove 94 that engages and mates against a corresponding small annular ridge 96 that protrudes into interior volume 70 of housing 16 to retain the bushing 92 within the female coupling member 10 when the male coupling member 12 is removed from the female coupling member 10. With continued reference to FIG. 16, female coupling member 10 exhibits a first inner bore 98, a transitional bore 100, and an intermediate bore 102, which lies between first inner bore 98 and transitional bore 100.

Figure 18:
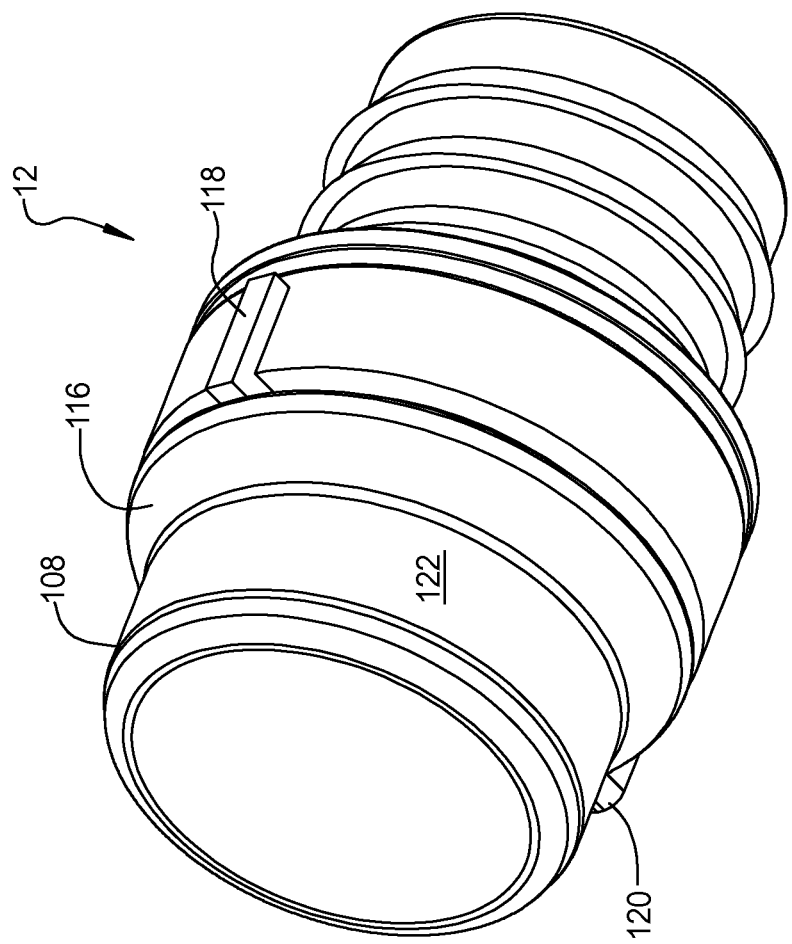
FIG. 18 is a perspective view of an embodiment of a male coupling member that is connectable into the female coupling member of FIG. 1.
Figure 19:
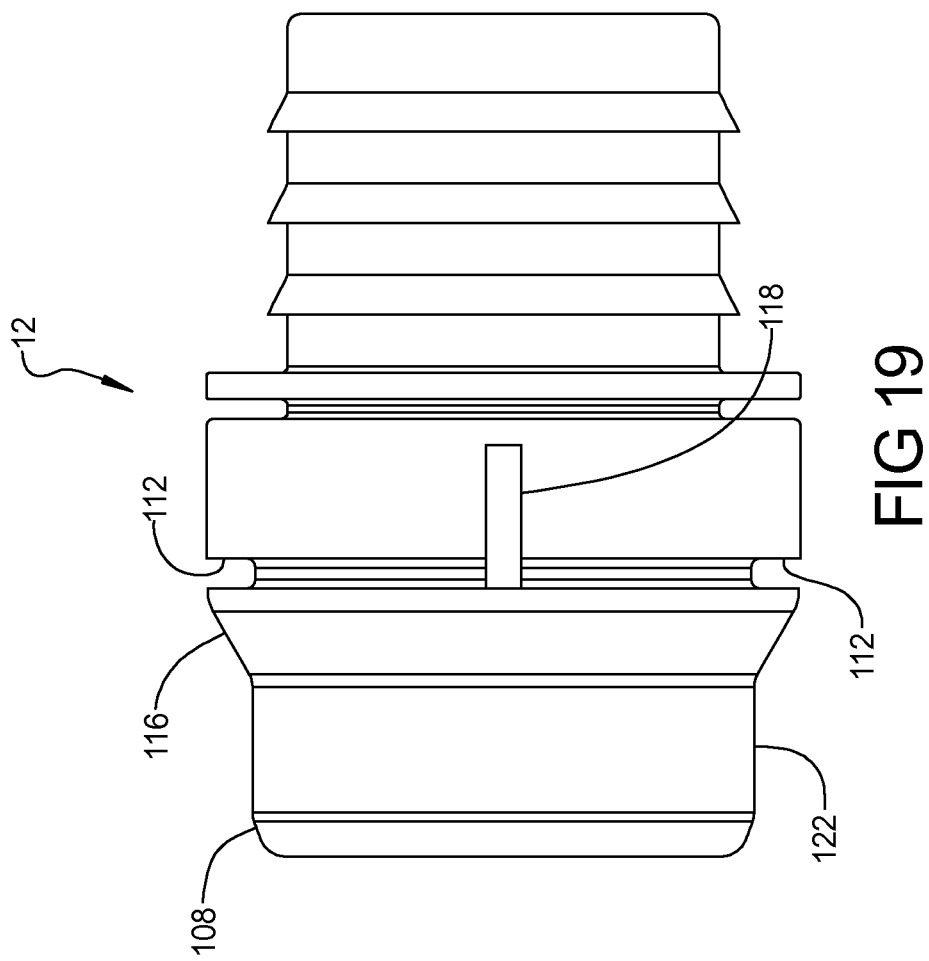
FIG. 19 is a side view of the male coupling member of FIG. 18.
Figure 20:
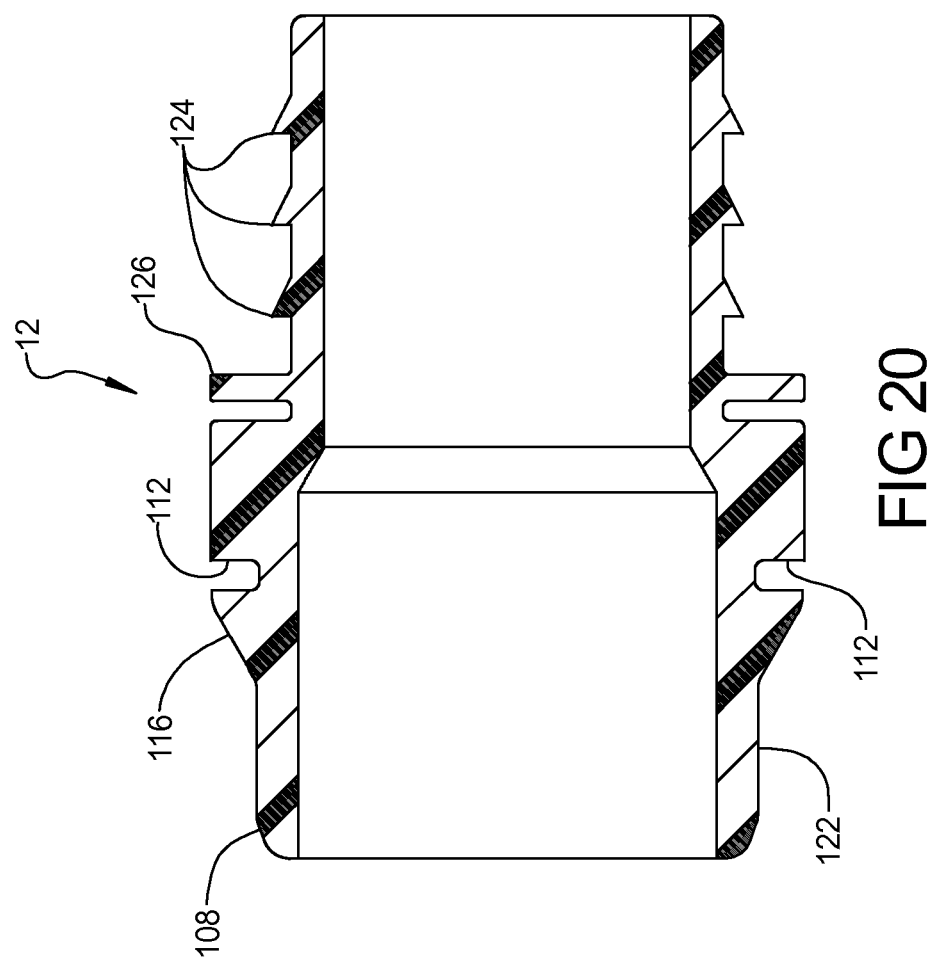
FIG. 20 is a cross-sectional view of the male coupling member of FIG. 18.

FIGS. 18, 19, and 20 depict the male coupling member 12, which is constructed in some ways complementary to, and works in some ways in conjunction with, female coupling member 10. More specifically, to bring together female coupling member 10 and male coupling member 12, insertion end 108 of male coupling member 12 is inserted into receiving end 110 (FIG. 16) of female coupling member 10. Male coupling member 12 is securely inserted and locked into female coupling member 10 when prongs 64, 66 of retainer 22 click or snap into a blind annular groove, or groove, 112 of male coupling member 12. FIG. 21 depicts male coupling member 12 secured within female coupling member 10.

In further description of male coupling member 12, FIG. 18 depicts blind groove 112 within which retainer 22 resides during a locked junction of male coupling member 12 and female coupling member 10. During a locked juncture, a chamfered surface 114 of bushing 92 (FIG. 16) comes into contact with a chamfered surface, or chamfer, 116 located on male coupling member 12. Moreover, as male coupling member 12 is inserted, protruding tabs 118, 120 of male coupling member 12 align with notches 104, 106 (FIGS. 1 and 17) of female coupling member 10. Also, as male coupling member 12 is inserted into female coupling member 10, the groove 112 is brought into axial alignment with the slot 56.

Male coupling member 12 may be secured within female coupling member 10 in one of two methods or circumstances. In a first method, retainer 22 may be situated with ends 26, 28 residing within grooves 58, 60 of female coupling member 10 and then male coupling member 12 may be inserted into female coupling member 10. Retainer 22 may then be forced upward such that retainer ends 26, 28 reside under respective covers 30, 32. With such an insertion method, prongs 64, 66 will reside within blind groove 112 of male coupling member 12. In a second method, the retainer 22 may already be positioned in female coupling member 10 such that ends 26, 28 reside under their respective covers 30, 32. With retainer 22 positioned as such, insertion end 108 of male coupling member 12 may be forced into receiving end 110 of female coupling member 10 until a "snap" or "click" is heard, along with a slight jolting of both, female coupling member 10 and male coupling member 12. During insertion, chamfered surface 116 causes prongs 64, 66 to ride up chamfered surface 116 and expand prongs 64, 66 such that they are forced from an inside of female coupling member 10 such that prongs 64, 66 do not interfere with insertion end 108 of male coupling member 12. That is, prongs 64, 66 are forced from internal volume of female coupling member 10. After hearing a snap or click when prongs 64, 66 pass completely over chamfered surface 116, prongs 64, 66 will spring into interior volume of female coupling member 10 so that prongs 64, 66 reside securely and are received within blind groove 112 of male coupling member 12. In both methods of insertion, tabs 118, 120 are received within notches 104, 106 and prevent rotational movement between male coupling member 12 and female coupling member 10 when coupled together. O-ring or sealing means 20 is elastomeric and compressible to provide a fluid-resistive seal between male coupling member 12 and female coupling member 10.

To release male coupling member 12 from female coupling member 10, raised portion 24 of retainer 22 is simply pulled from female coupling member 10 until ends 26, 28 move from under covers 30, 32 to within grooves 58, 60 of housing 16, that is, from retainer 22 position depicted in FIG. 4 to that of FIG. 5 to permit male coupling member 12 to slide from female coupling member 10.

FIG. 20 depicts barbed flanges 124 and conduit stop flange 126 in a cross-sectional view of male coupling member 12. Barbed flanges 124 and conduit stop flange 126 function in the same way as corresponding parts described above in connection with female coupling member 10. Together, barbed flanges 124 and conduit stop flange 126 assist in securing a flexible conduit (not shown) to male coupling member 12.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A connector assembly, comprising:
a female coupler having a first end and a second end, and having a first fluid passage extending between said first and second ends, the second end constructed to fit with a first conduit, the female coupler having a first retainer flange located at an exterior surface of the female coupler, and the female coupler having a second retainer flange located at the exterior surface, the first retainer flange having a first portion and a second portion, the first portion has a first radial extent with respect to the exterior surface and the second portion has a second radial extent with respect to the exterior surface, the second radial extent being greater than the first radial extent, the second retainer flange having a third portion and a fourth portion, the third portion has a third radial extent with respect to the exterior surface and the fourth portion has a fourth radial extent with respect to the exterior surface, the fourth radial extent is smaller than the third radial extent;
a retainer carried by the female coupler, the retainer having a portion locatable within the first fluid passage, the retainer having a bridge located outside of said fluid passage and externally accessible by a user; and
a male coupler having a first end that can be inserted into the first end of the female coupler, the male coupler having a second end constructed to fit with a second conduit, the male coupler having a second fluid passage extending between its first and second ends, the male coupler having a groove;
wherein, when the female coupler and the male coupler are brought together and the first and second fluid passages communicate with each other, the portion of the retainer is receivable within the groove of the male coupler in order to inhibit separation of the male and female couplers, a second portion of the retainer is secured between the first portion of the first retainer flange and the third portion of the second retainer flange, the second portion of the retainer lying radially inwardly of the first radial extent and of the third radial extent, the bridge of the retainer is secured and positioned between the first and second retainer flanges at the second and fourth portions of the first and second retainer flanges, the bridge lies radially inwardly of a radially-outwardly edge of the second portion of the first retainer flange and lies radially inwardly of the second radial extent across the entire extent of the bridge that is located outside of the first fluid passage, the bridge lies radially outwardly of the fourth portion at the radial extent of the fourth portion, and the bridge is protected from inadvertent dislodging, by being radially inward of the second portion second radial extent of the first retainer flange, across the entire extent of the bridge that is located outside of the fluid passage; and wherein the bridge is retained longitudinally in-between the fourth radial extent and the second radial extent.

2. A connector assembly as defined in claim 1, wherein said second end of said female coupler is constructed as a nipple with a plurality of barbs located thereon, and said second end of said female coupler is constructed for insertion within said first conduit.

3. A connector assembly as defined in claim 1, wherein said female coupler has a slot located therein, said slot being open to said first fluid passage, said slot being axially aligned with said groove when said female coupler and said male coupler are brought together, said portion of said retainer extendable through said slot for location within said first fluid passage and for reception within said groove of said male coupler when said female coupler and said male coupler are brought together.

4. A connector assembly as defined in claim 1, wherein said female coupler has a recess located in an exterior surface thereof, and said retainer has an end portion, said end portion being seated in said recess before said portion of said retainer is received within said groove of said male coupler.

5. A connector assembly as defined in claim 1, wherein said female coupler has a cover extending from an exterior surface thereof, and said retainer has an end portion, said end portion being located generally within an interior of said cover after said portion of said retainer is received within said groove of said male coupler.

6. A connector assembly as defined in claim 1, wherein said female coupler has a slot located therein, said slot being open to said first fluid passage, said retainer moveable between a first position wherein said portion of said retainer is located outside of said first fluid passage and said portion of said retainer is not received within said groove of said male coupler, and a second position wherein said portion of said retainer is extended through said slot and said portion of said retainer is received within said groove of said male coupler.

7. A connector assembly as defined in claim 1, wherein said female coupler has a first slot located therein and has a second slot located therein, said first and second slots being open to said first fluid passage, said retainer being a wire spring with a first leg and a second leg, said first leg or said second leg constituting said portion of said retainer locatable within said first fluid passage, said wire spring moveable between a first position wherein said first and second legs are located outside of said first fluid passage and said first and second legs are not received within said groove of said male coupler, and a second position wherein i) said first and second legs are displaced inwardly with respect to said first fluid passage, ii) said first and second legs extend respectively through said first and second slots, and iii) said first and second legs are received within said groove.

8. A connector assembly as defined in claim 7, wherein said bridge extends between said first and second legs, said bridge located outside of said first fluid passage and externally accessible by a user when said wire spring is in said first position and when said wire spring is in said second position, and, when said wire spring is moved to said second position, said bridge is moved in a direction toward said first fluid passage.

9. A connector assembly as defined in claim 1, wherein said male coupler has a chamfer located at an exterior surface thereof and positioned forward of said groove with respect to said first end of said male coupler, and, when said female coupler and said male coupler are brought together, said portion of said retainer rides on said chamfer and is received within said groove in order to inhibit separation of said male and female couplers.

10. A connector assembly as defined in claim 1, wherein said second end of said male coupler is constructed as a nipple with a plurality of barbs located thereon, and said second end of said male coupler is constructed for insertion within said second conduit.

11. A connector assembly as defined in claim 1, wherein said female coupler has a notch located in an interior surface thereof, said male coupler has a tab extending from an exterior surface thereof, and, when said female coupler and said male coupler are brought together, said tab is inserted into said notch in order to prevent rotational movement between said female and male couplers.

12. A connector assembly as defined in claim 1, further comprising a bushing located within said first fluid passage, said bushing facilitating insertion of said male coupler into said female coupler.

13. A connector assembly as defined in claim 12, wherein said first fluid passage has an annular ridge formed therein, and said bushing has an annular groove shaped complementary to said annular ridge, and wherein said annular ridge mates with said annular groove to help retain said bushing in said first fluid passage when said female and male couplers are brought apart.

14. A connector assembly as defined in claim 1, further comprising an o-ring located within said first fluid passage, said o-ring forming a seal between said female and male couplers when said female and male couplers are brought together.

15. A connector assembly, comprising:
a first coupler having a first end and a second end, and having a first fluid passage extending between the first and second ends, the second end constructed to fit with a first conduit, the first coupler having a slot being open to the first fluid passage, the first coupler having a first retainer flange located at an exterior surface of the first coupler, and the first coupler having a second retainer flange located at the exterior surface, the first retainer flange located at an axial position on the exterior surface closer to the first end than the second retainer flange, the first retainer flange having a first portion and a second portion, the first portion has a radial extent with respect to the exterior surface and the second portion has a second radial extent with respect to the exterior surface, the second radial extent being greater than the first radial extent, the second retainer flange having a third portion and a fourth portion, the third portion has a third radial extent with respect to the exterior surface and the fourth portion has a fourth radial extent with respect to the exterior surface, the fourth radial extent is smaller than the third radial extent;
a second coupler having a first end and a second end, and having a second fluid passage extending between its first and second ends, the second end of the second coupler constructed to fit with a second conduit, the second coupler having a groove; and
a retainer carried by said first coupler, the retainer having a portion extendable through the slot of the first coupler, the retainer having a bridge located outside of the slot and externally accessible by a user;
wherein, when the first and second couplers are brought together and the first and second fluid passages communicate with each other, the slot and the groove are aligned with each other and the portion of the retainer is extended through the slot and received within the groove of the second coupler in order to inhibit separation of the first and second couplers, a second portion of the retainer is secured between the first portion of the first retainer flange and the third portion of the second retainer flange, the second portion of the retainer lying radially inwardly of the first radial extent and of the third radial extent, the bridge of the retainer is secured and positioned between the first and second retainer flanges at the second and fourth portions, the bridge lies radially inwardly of a radially-outwardly edge of the second portion of the first retainer flange and lies radially inwardly of the second radial extent across the entire extent of the bridge that is located outside of the slot, the bridge lies radially outwardly of the fourth portion at the radial extent of the further portion; and wherein the bridge is retained longitudinally in-between the fourth radial extent and the second radial extent.

16. A connector assembly as defined in claim 15, wherein said first coupler is a female coupler and said second coupler is a male coupler, said first end of said male coupler being inserted into said first end of said female coupler when said couplers are brought together and said first and second fluid passages communicate with each other.

17. A connector assembly as defined in claim 15, wherein said first coupler has a second slot located therein, said second slot being open to said first fluid passage, said retainer being a wire spring with a first leg and a second leg, said first leg or said second leg constituting said first portion of said retainer receivable within said groove of said second coupler, said wire spring moveable between a first position wherein said first and second legs are not received within said groove of said second coupler, and a second position wherein i) said first and second legs are displaced inwardly with respect to said first fluid passage, ii) said first and second legs extend respectively through said first and second slots, and iii) said first and second legs are received within said groove of said second coupler.

18. A connector assembly as defined in claim 17, wherein said wire spring has a bridge extending between said first and second legs, said bridge constituting said second portion of said retainer, said bridge located outside of said first fluid passage and externally accessible by a user when said wire spring is in said first position and when said wire spring is in said second position, and, when said wire spring is moved to said second position, said bridge is moved in a direction toward said first fluid passage.

19. A connector assembly as defined in claim 15, wherein said second coupler has a chamfer located at an exterior surface thereof and positioned forward of said groove with respect to said first end of said second coupler, and, when said first coupler and said second coupler are brought together, said first portion of said retainer rides on said chamfer and is received within said groove in order to inhibit separation of said first and second couplers.

20. A connector assembly, comprising:
a female coupler having a first end and a second end, the second end constructed to fit with a first conduit, the female coupler also having a first fluid passage extending between the first and second ends, and the female coupler having a first retainer flange located at an exterior surface thereof and having a second retainer flange located at the exterior surface, the first retainer flange having a first portion and a second portion, the first portion has a first radial extent and the second portion has a second radial extent with respect to the exterior surface, the second radial extent being greater than the first radial extent, the second retainer flange having a third portion and a fourth portion, the third portion has a third radial extent with respect to the exterior surface and the fourth portion has a fourth radial extent with respect to the exterior surface, the fourth radial extent is smaller than the third radial extent;
a retainer carried by the female coupler, the retainer having a first portion locatable within the first fluid passage and having a second portion located at an exterior of same female coupler and outside of the first fluid passage when the first portion of the retainer is located within the first fluid passage;
a male coupler having a first end insertable into the first end of the female coupler, the male coupler having a second end constructed to fit with a second conduit, the male coupler having a second fluid passage extending between its first and second ends, the male coupler having a groove;
wherein, when the female coupler and the male coupler are brought together and the first and second fluid passages communicate with each other, the first portion of the retainer is received within the groove of the male coupler in order to inhibit separation of the male and female couplers, a third portion of the retainer is secured between the first portion of the first retainer flange and the third portion of the second retainer flange, said third portion of the retainer lying radially inwardly of the first radial extent and of the third radial extent, and the second portion of the retainer is secured and positioned between the first and second retainer flanges at the second and fourth portions of the first and second retainer flanges, and the second portion of the retainer lies radially inwardly of a radially-outwardly edge of said second portion of the first retainer flange and lies radially inwardly of the second radial extent across the entire extent of the second portion of the retainer that is located at an exterior of the female coupler and outside of the first fluid passage, the second portion of the retainer lies radially outwardly of the fourth portion at the radial extent of the fourth portion, and the second portion of the retainer is protected from inadvertent dislodging out of securement by being positioned radially inward of the second portion second radial extent of the first retainer flange; and wherein the second portion of the retainer is retained longitudinally in-between the fourth radial extent and the second radial extent.

21. A connector assembly, comprising:
a female coupler having a first end and a second end, and having a first fluid passage extending between the first and second ends, the female coupler having a first retainer flange located at an exterior surface of the female coupler, and the female coupler having a second retainer flange located at the exterior surface, the first retainer flange having a first portion and a second portion, the first portion has a first radial extent with respect to the exterior surface and the second portion has a second radial extent with respect to the exterior surface, the second radial extent being greater than the first radial extent, the retainer flange having a third portion and a fourth portion, the third portion has a third radial extent with respect to the exterior surface and the fourth portion has a fourth radial extent with respect to the exterior surface, the fourth radial extent is smaller than the third radial extent; and
a retainer carried by the female coupler, the retainer having a first portion locatable within the first fluid passage, the retainer having a bridge located outside of the fluid passage;
wherein, in assembly, a second portion of the retainer is secured between the first portion of the first retainer flange and the third portion of the second retainer flange, the second portion of the retainer lying radially inwardly of the first radial extent and of the third radial extent, the bridge of the retainer is secured and positioned between the second and fourth portions of the first and second retainer flanges, the bridge lies radially inwardly of the second radial extent, and the bridge lies radially outward of the fourth portion; and wherein the bridge is retained longitudinally in-between the fourth radial extent and the second radial extent.

* * * * *